United States Patent [19]
Morita

[11] Patent Number: 5,402,278
[45] Date of Patent: Mar. 28, 1995

[54] METHOD FOR RECORDING A POSITIONING SIGNAL ON A MAGNETIC RECORDING DISK AND APPARATUS FOR RECORDING THE SAME

[75] Inventor: Osamu Morita, Kanagawa, Japan

[73] Assignee: Sony Corporation, Tokyo, Japan

[21] Appl. No.: 107,435

[22] Filed: Aug. 16, 1993

[30] Foreign Application Priority Data

Aug. 17, 1992 [JP] Japan .................................. 4-217935

[51] Int. Cl.$^6$ .......................... G11B 5/596; G11B 5/02; G11B 5/82
[52] U.S. Cl. ................. 360/77.05; 360/77.02; 360/55; 360/135
[58] Field of Search ..................... 360/77.03, 55, 77.05, 360/135, 77.08, 77.02

[56] References Cited

U.S. PATENT DOCUMENTS 5,296,995  3/1994  Yonezawa et al. ............... 360/55 X

FOREIGN PATENT DOCUMENTS 3-228219  8/1991  Japan .

Primary Examiner—Donald Hajec
Assistant Examiner—T. N. Forbus, Jr.
Attorney, Agent, or Firm—Pasquale Musacchio; Jerry A. Miller

[57] ABSTRACT

This invention relates to a method for recording a positioning signal on a disk having a projection pattern. The method includes rotating a magnetic disk having a magnetic layer on a non-magnetic substrate having a projection pattern thereon, flowing the first DC current to a magnetic head, moving the magnetic head in the direction of the diameter over the magnetic disk whereby to magnetize the whole magnetic layer of the magnetic disk in the first direction, then rotating the magnetic disk, flowing the second DC current to the magnetic head, moving the magnetic head in the direction of the diameter over the magnetic disk whereby to magnetize only the magnetic layer of the projection portion of the magnetic disk in the second direction opposite to the first direction so as to record a positioning signal on the magnetic disk.

9 Claims, 13 Drawing Sheets

METHOD FOR RECORDING A POSITIONING SIGNAL ON A MAGNETIC RECORDING DISK AND APPARATUS FOR RECORDING THE SAME

FIELD OF THE INVENTION

This invention relates to a method for recording a positioning signal on a magnetic disk, and more particularly, a method for recording a positioning signal for a magnetic head on a magnetic disk having a projection pattern.

BACKGROUND OF THE INVENTION

In many magnetic recording systems, the track density of a magnetic disk is increased in order to increase recording capacity. When tracking density is high, accurate positioning or tracking of a magnetic head on a magnetic recording disk is important. Many types of tracking servo systems have been developed to provide accurate tracking. In many tracking servo systems, a magnetic head reproduces a positioning signal recorded on a magnetic disk and a head actuator controls the magnetic head to position the magnetic head-at the center of the track in accordance with this reproduced positioning signal.

When a magnetic head records a positioning signal on a magnetic disk, a moving mechanism controls the magnetic head to an accurate position. Therefore, the accuracy of the positioning signal, or tracking accuracy, depends on the accuracy of the moving mechanism. However, it is difficult to increase the accuracy of the moving mechanism. In addition, the relatively low accuracy of the moving mechanism prevents the track density from being sufficiently high.

To solve this problem, a magnetic disk having a projection pattern is suggested. The magnetic disk is prepared as follows. A projection pattern is formed on a surface of a non-magnetic substrate by a photolithography and so on, a magnetic layer is put on the surface of the non-magnetic substrate, a magnetization is recorded on the projection of the magnetic layer and an inverse magnetization is recorded on the bump of the magnetic layer. The accuracy of the projection pattern formed by a photolithography determines the accuracy of the positioning signal.

When the positioning signal is recorded on the magnetic layer, the difference between the distance from the magnetic head to the surface of the magnetic layer of the projection and from the magnetic head to the surface of the magnetic layer of the bump is utilized. The magnetic layer of the projection is comparatively near to the magnetic head. Therefore, it is easy to magnetize the magnetic layer of the projection in the direction. But the magnetic layer of the bump is comparatively far from the magnetic head. Therefore, it is difficult to magnetize the magnetic layer of the bump in the direction.

FIGS. 15a and 15b show a method for recording a positioning signal on a magnetic disk. A magnetic disk 1 has a projection pattern (a projection 13 and a bump 14) on a surface. A DC current is impressed on a magnetic head having a magnetic gap G of a comparatively strong magnetic field $M_1$ reaching a bump 14 of a magnetic disk 1. While the magnetic disk 1 is rotated in the direction of the arrow A, the magnetic head 3a is moved in the direction of the diameter. The magnetization m1 is recorded on the all area, including the projection 13 and the bump 14 of the magnetic layer 12.

After that, an inverse DC current is impressed on a magnetic head 3b having a magnetic gap G of a comparatively narrow gap width gb to generate a comparatively weak magnetic field $M_2$ as shown in FIG. 15b. The magnetic field $M_2$ is not strong enough to invert the magnetization m1 of the bump 14, but is strong enough to invert the magnetization m1 of the projection 13. So, the magnetization m1 is recorded on all of the projection 13.

Thus, the accuracy of the positioning signal depends on the accuracy of the projection patterning. Consequently, it is possible to prepare a magnetic disk having a high track density.

But in this way it is necessary to prepare two kinds of magnetic heads having a different gap width and to exchange these magnetic heads. Because the recording area is formed on both sides of the magnetic disk, it is necessary to exchange the magnetic heads two times per one magnetic disk. Therefore, it is not effective to produce the magnetic disk by this way.

SUMMARY OF THE INVENTION

One object of this invention is to simplify a method or an apparatus for recording a positioning signal on a magnetic disk by eliminating an exchange of magnetic heads.

Another object of this invention is to improve the productivity of magnetic disks.

According to one aspect of this invention, there is provided a method for recording a positioning signal on a magnetic disk comprised of rotating the magnetic disk having a magnetic layer on a non-magnetic substrate having a projection pattern thereon, flowing the first DC current to a magnetic head moving the magnetic head moving the magnetic head in the direction of the diameter over the magnetic disk whereby to magnetize the whole magnetic layer of the magnetic disk in the first direction, then rotating the magnetic disk, flowing the second DC current to the magnetic head, moving the magnetic head in the direction of the diameter over the magnet disk whereby to magnetize only the magnetic layer of the projection portion of the magnetic disk in the second direction opposite to the first direction.

According to another aspect of this invention, there is provided apparatus for recording a positioning signal on a magnetic disk comprised of a rotating means to rotate the magnetic disk having a magnetic layer on a non-magnetic substrate having a projection pattern thereon, a magnetic head to magnetize the magnetic disk and change a pole and dimension of a DC current which is flown to the magnetic head, a moving means to move the magnetic head in the direction of the diameter over the magnetic disk.

DESCRIPTION OF THE INVENTION

Figure 5:
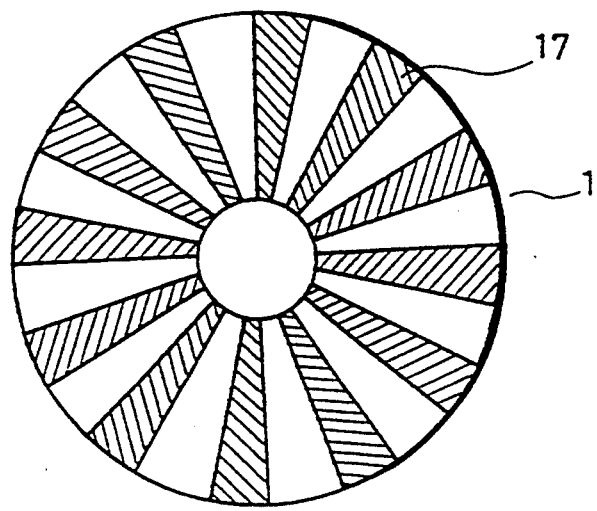
FIG. 5 illustrates one embodiment of a sampled-servo format of the present invention.

The present invention will now be described by referring to the figures, in which like reference numerals indicate like elements. The embodiments are applied to a sampled-servo format in which a fan-shaped recording area of a positioning signal, namely a servo-zone, is provided on a magnetic disk as shown schematically in FIG. 5. But the present invention is not limited to the sampled-servo format, but is applied to all kinds of tracking-servo formats, for example a recording area of a positioning signal is provided on a whole surface of a magnetic disk and so on.

Figure 6:
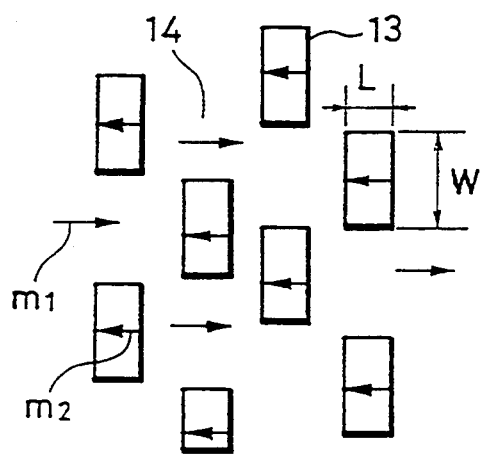
FIG. 6 is a diagram of one embodiment of a projection pattern of the present invention.

Eight hundred servo-zones 17 are provided at regular intervals on a magnetic disk. Referring to FIG. 6, rectangular projections 13 are disposed in the servo-zone 17 corresponding with signals. The rectangular projection 13 has a length W of 5 um in the direction of a track width and a length L of 0.7~2.9 um in the direction of a circumference.

Various kinds of methods, for example RE (Reactive Ion Etching), Glass p (Photo Polymer) and so on, are applied to the present invention as a method for forming the projection pattern on a non-magnetic substrate. In this Case, a non-magnetic substrate having a thickness of a 0.9 mm is used and a projection having a depth of 0.2 um is formed on the substrate by an ion etching.

A magnetic disk comprises Molybdenum (Mo) under layer of 100 mm, a Cobalt,Platinum (CoPt) magnetic layer of 50 um and a carbon (C) protective layer of 10 um formed in order by sputtering process on the substrate having the projection pattern thereon. Another magnetic disk comprises Chrome (Cr) under layer of 100 nm, a Cobalt, Nickel,Chrome (CoNiCr) magnetic layer of 50 um and a C protective layer of 250 um formed in order on the substrate having the projection pattern thereon.

These magnetic disks are recorded positioning signal as shown in FIG. 6 by methods and apparatuses mentioned in examples 1~7.

EXAMPLE 1

Figure 1A:
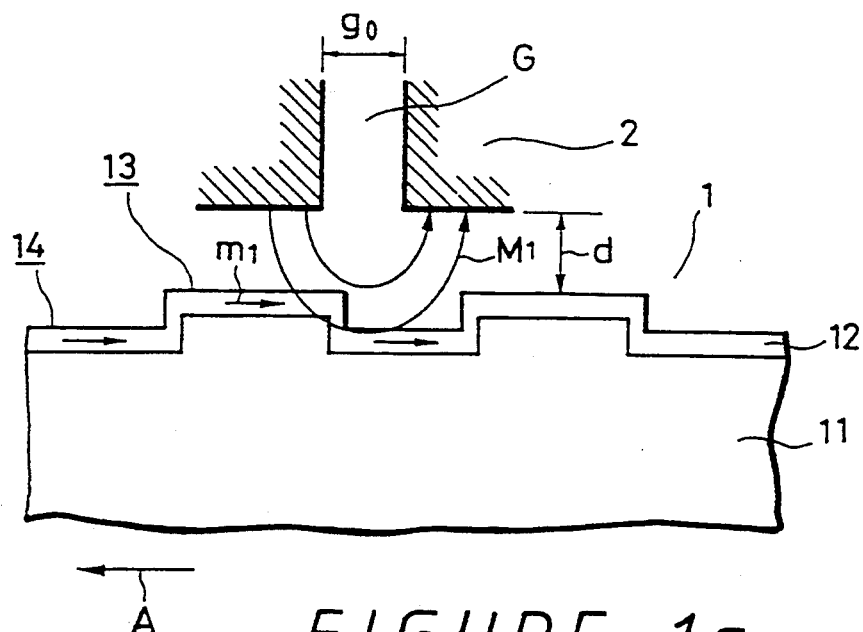
FIGS. 1a and 1b depict an embodiment of a recording method for a positioning signal of the present invention.
Figure 1B:
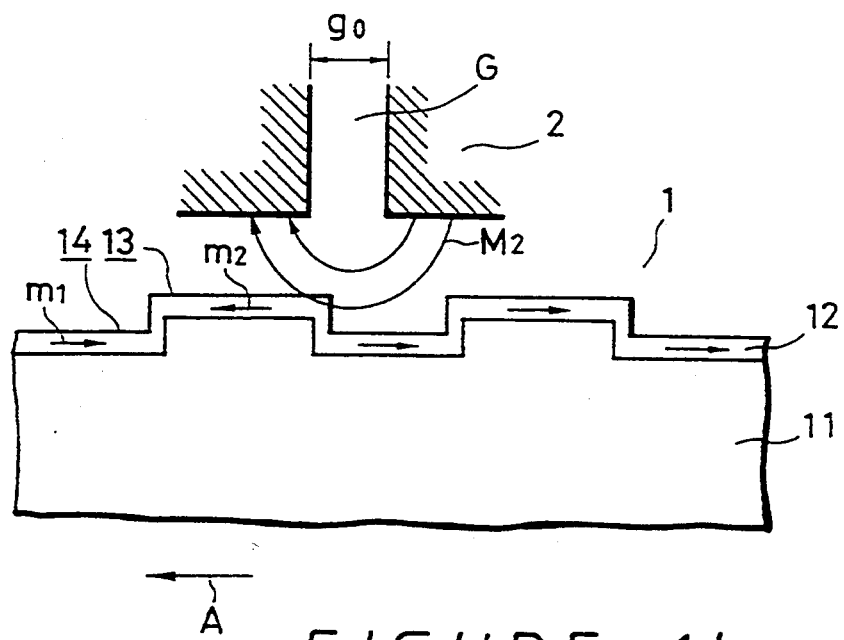

Referring to FIG. 1a, moving the magnetic disk in the direction of arrow A and moving the magnetic head 2 in the direction of a diameter over the magnetic disk 1, the first DC current was flown to the magnetic head 2. The whole magnetic layer 12, including the projection 13 and the bump 14 of the magnetic disk 1, was magnetized in the direction of the magnetization m1 thereby. After that, moving the magnetic disk 1 and the magnetic head 2 in the manner mentioned above, the second DC current being opposite to the first DC current and being smaller than the first DC current was flown to the magnetic head 2. The magnetic layer 12 of the projection 13 of the magnetic disk 1 was magnetized in the direction of the magnetization m2 having opposite direction to the magnetization m1 to record the positioning signal.

The magnetic head 2 having a gap length go of 0.4 um, a track width of 100 um and a number of turns of 56 (center-tap wind) was used. A relative velocity between the magnetic head 2 and the magnetic disk 1 was 6 ms, and the magnetic disk 1 was flown thereby. The distance d from the surface of the magnetic disk 1 to the magnetic head 2 was 0.13 um.

Figure 7:
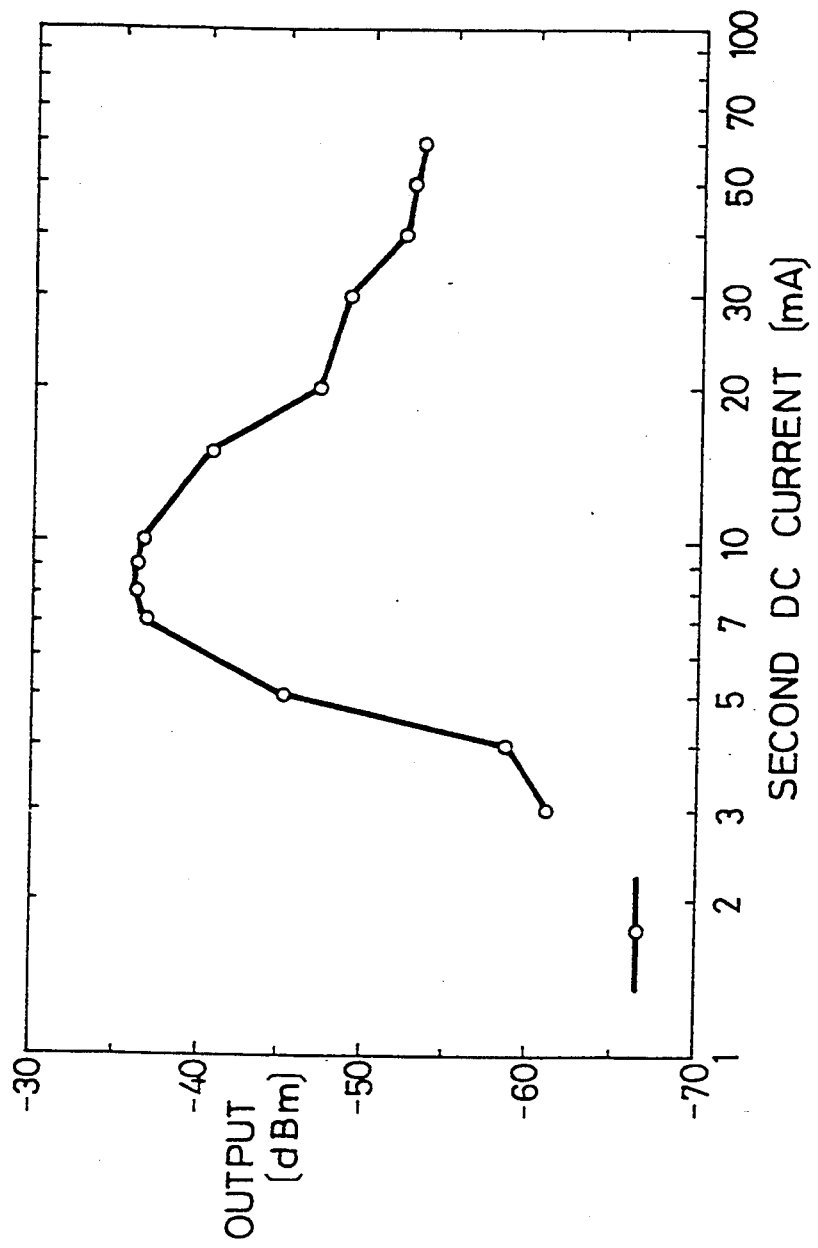
FIG. 7 is a diagram showing a relation between reproduction output and second DC current.

A change of the reproducing output was measured when the first DC current was fixed at 60 mA and the second DC current was changed to record the positioning signal. This result was shown in FIG. 7. When the second DC current was in the range of 7-10 mA, the positioning signal on the magnetic disk 1 was reproduced with signal to noise ration (SN) ratio enough for servo control.

Thus, because the positioning signal is recorded by one magnetic head and the exchange of the heads is omitted, the productivity of magnetic disks is improved.

EXAMPLE 2

In this example, the magnetic disk 1 not recorded the positioning signal was set in a conventional drive-system. After setting the magnetic disk 1, the positioning signal was recorded on the magnetic disk 1 by the magnetic head having a gap length go of 0.4 um and a track width of 10 um and set in the drive-system in a similar manner to Example 1. Moving the magnetic head at the same pitch as the track width from the outside to the inside of the magnetic disk, the first DC current of 60 mA was flown to the magnetic head. The whole magnetic layer 12 was magnetized in the direction of the magnetization m1 thereby. After that, moving the magnetic head in the manner mentioned above, the second DC current of 8 mA being opposite to the first DC current was flown to the magnetic head. The projection 13 of the magnetic disk was only magnetized in the direction the magnetization m2. The positioning signal was reproduced with SN ratio enough for servo control by the magnetic head for reproducing set in the servo-system.

Because the positioning signal was recorded in a conventional drive-system, the productivity was improved.

EXAMPLE 3

Figure 2A:
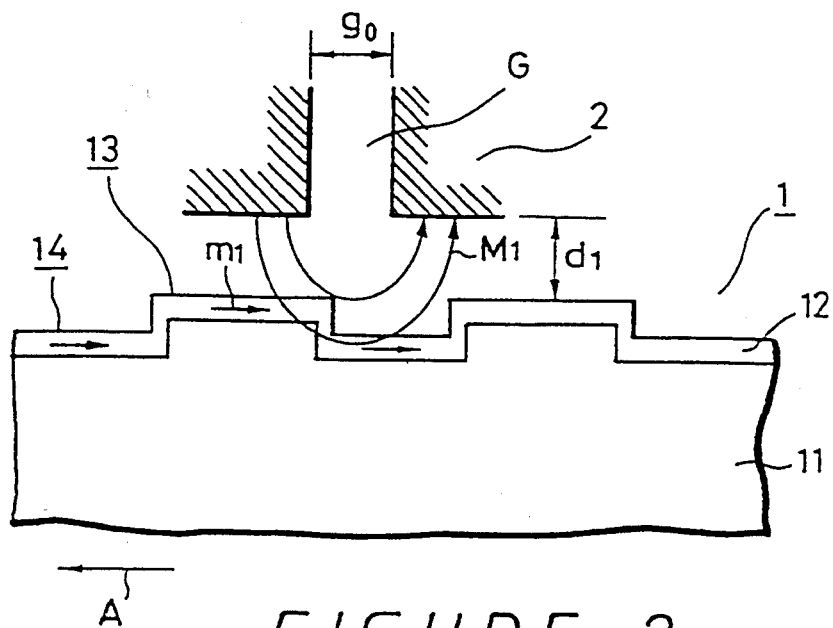
FIGS. 2a and 2b depict another embodiment of a recording method for a positioning signal of the present invention.
Figure 2B:
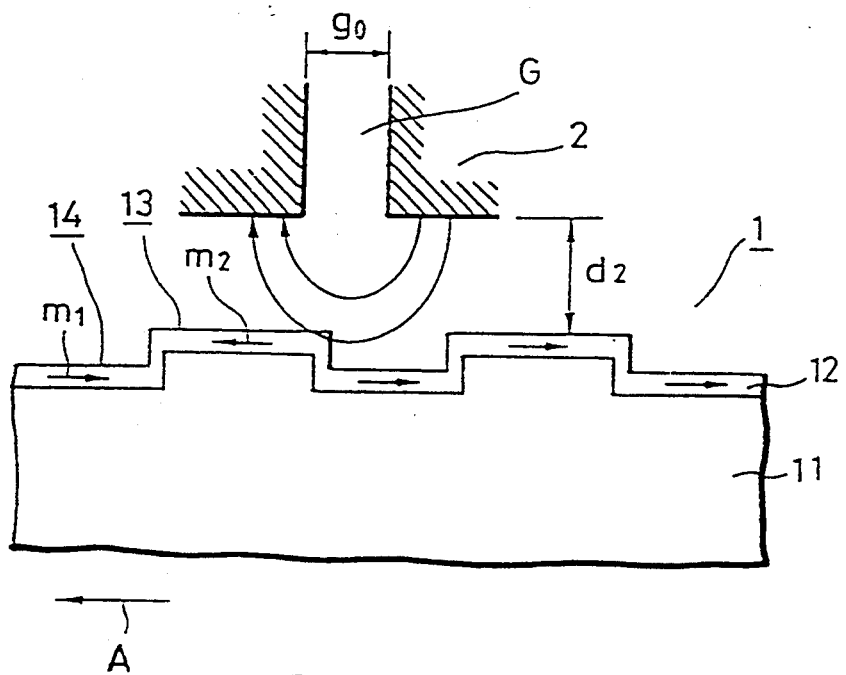

The first DC current was flown to the magnetic head at the flying height of d1 shown in FIG. 2a so that the whole magnetic layer 12 of the magnetic disk 1 was magnetized in the direction of the magnetization m1. After that, the second DC current, being opposite to the first DC current, was flown to the magnetic head at the flying height of d2, being smaller than the flying height of d1 shown in FIG. 2B, to record the positioning signal so that the projection portion 13 of the magnetic disk was only magnetized in the direction of the magnetization m2.

Rotating the magnetic disk 1 at a number of revolutions of 3,600 rpm to be at the flying height d1 of 0.13 um, the magnetic head 2 having a gap length $g_o$ of 0.4 um, a track width of 100 um and a number of turns of 56 (center-tap wind) magnetized the magnetic disk 1 uniformly. After that, rotating the magnetic disk 1 at a number of revolutions of 9,400 rpm to be at the flying height d2 of 1.0 um.

Rotating the magnetic disk at a number of revolutions of 3,600 rpm to be at the flying height d1 of 0.13 um, the first DC current of 60 mA was flown to the magnetic head 2 having a gap length go of 0.8 um, a track width of 100 um and a number of turns of 56 (center-tap wind) so that the whole magnetic layer 12 of the magnetic disk was magnetized in the direction of the magnetization m1. After that, rotating the magnetic disk 1 at a number of revolutions of 9,400 rpm to be at the flying height d2 of 1.0 um, the second DC current of 60 mA was flown to the same magnetic head 2 as shown above so that the projection portion 13 of the magnetic disk was only magnetized in the direction of the magnetization m2 to record the positioning signal.

After the magnetic disk recorded the positioning signal was set in a conventional drive-system, the magnetic disk was reproduced.

The positioning signal on the magnetic disk 1 was reproduced with SN ratio enough for servo control.

Thus, because the positioning signal is recorded by one magnetic head and the exchange of the magnetic heads is omitted, the productivity of magnetic disks is improved.

EXAMPLE 4

In this example, the magnetic disk not recorded the positioning signal was set in a conventional drive-system. While the magnetic disk 1 was rotated at a number of revolutions of 3,600 rpm to be at the flying height d1 of 0.13 um, the first DC current of 50 mA was flown to the magnetic head set in the conventional drive-system, having a gap length $g_o$ of 0.4 um and a track width of 10 um, and moved at the same pitch as the track width from the outside to the inside of the magnetic disk. The whole magnetic layer 12 of the magnetic disk was magnetized in the direction of the magnetization m1 thereby. After that, while the magnetic disk was rotated at a number of revolutions of 9,400 rpm to be at the flying height d2 of 1.0 um, the second DC current of 50 mA was flown to the same magnetic head as shown above so that the projection portion 13 of the magnetic disk was only magnetized in the direction of the magnetization m2 to record the positioning signal. The positioning signal was reproduced with SN ratio enough for servo control by the magnetic head for reproducing set in the servo-system.

Because the positioning signal is recorded in a conventional drive-system, the productivity is improved.

EXAMPLE 5

Figure 3A:
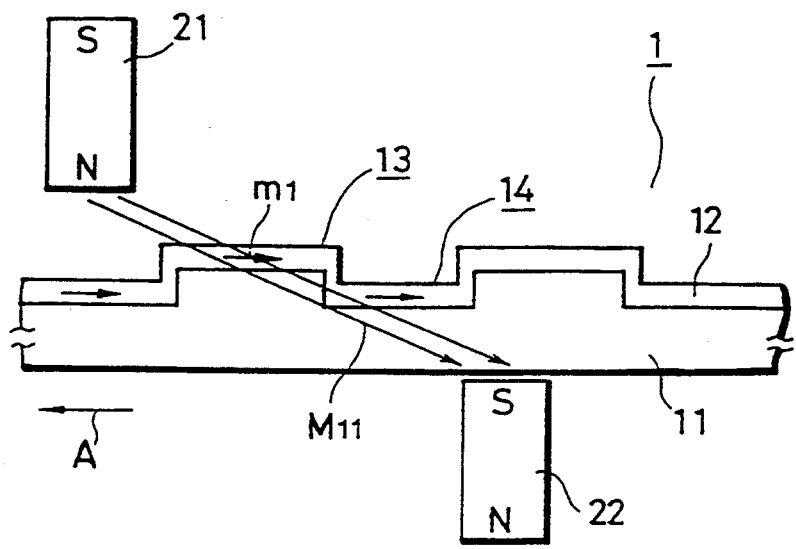
FIGS. 3a and 3b depict a further embodiment of a recording method for a positioning signal of the present invention.
Figure 8:
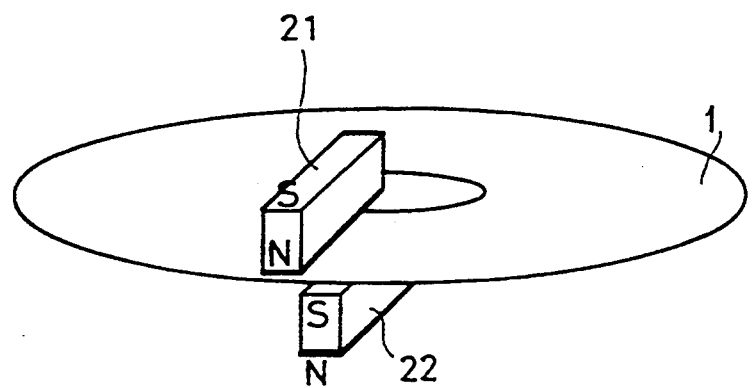
FIG. 8 depicts another embodiment of a recording method for a positioning signal of the present invention.

In this example, the positioning signal was recorded by using a permanent magnet or an electro magnet instead of a magnetic head. Referring to FIG. 8, the magnetic disk 1 was put between the first permanent magnet 21 and the second permanent magnet 22 having a length of the diameter of the magnetic disk or more, polarized in the direction of the thickness of the magnetic disk, held by a holding means not shown in FIG. 8 and disposed at the predetermined distance. The magnetic disk 1 was put between the opposite poles of the first magnet 21 and the second magnet 22, for example the positive pole of the first magnet 21 and the negative pole of the second magnet 22 which were spaced apart in the direction of the circumference of the magnetic disk. Referring to FIG. 3a, while the magnetic disk 1 was rotated, the magnetic layer 12 was uniformly magnetized in the direction of the magnetization m1 by the first and second permanent magnets 21 and 22.

Figure 9A:
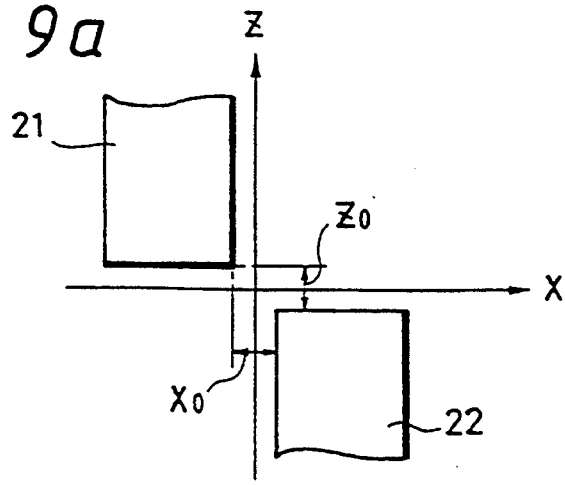
FIGS. 9a and 9b illustrate a distribution of magnetic flux density by magnet.

The distribution of the magnetic flux density on the surface of the magnetic disk in such a disposal as shown above was measured by Static Magnetic Field Analysis. This will be described by referring to FIGS. 9a and 9b. Referring to FIG. 9a, the X axis is the direction of the circumference of the magnetic disk 1 and Z axis is the direction of the thickness of the magnetic disk 1. Each length of the first and second magnets 21 and 22 was 6 mm in the direction of X axis, 20 mm in the direction of the Z axis. The distance Zo from the end of the first magnet 21 to the end of the second magnet 22 in the direction of the Z axis was 6 mm and the distance Xo from the sidewall of the first magnet 21 to the sidewall of the second magnet 22 in the direction of the X axis was 2 mm.

Figure 9B:
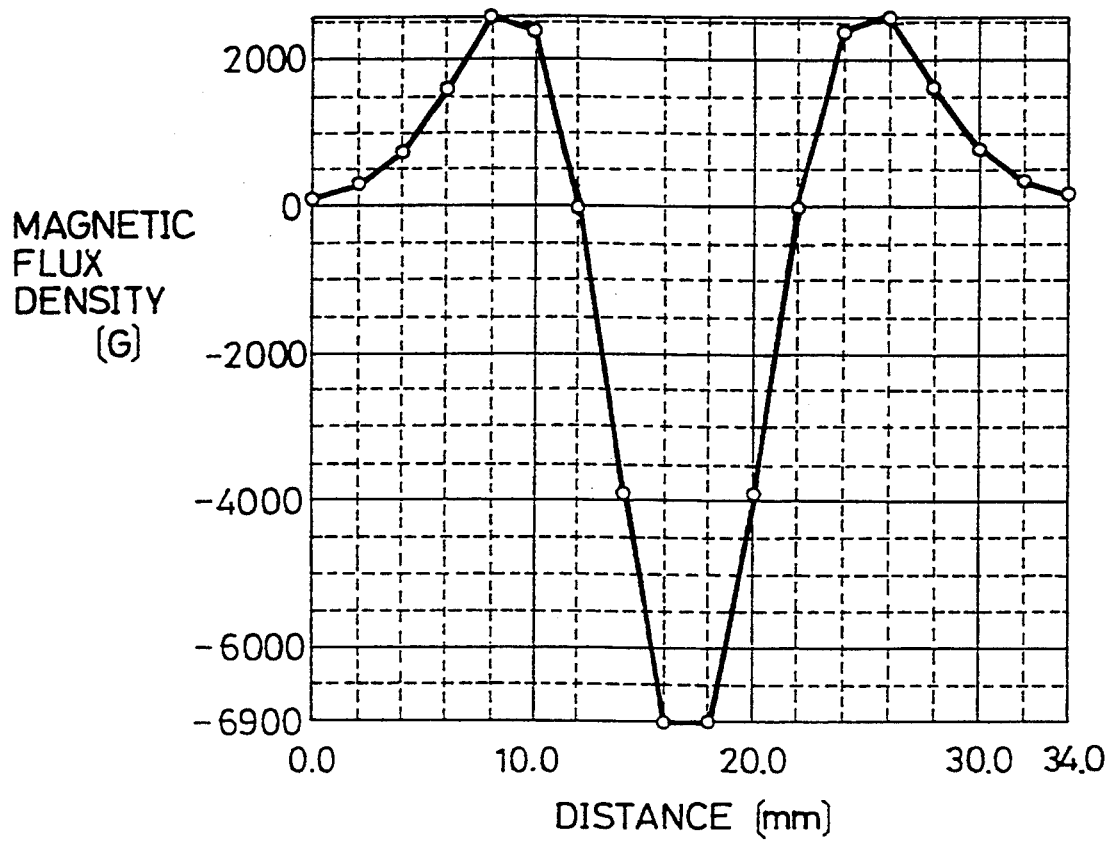

Referring to FIG. 9b, the distribution of the magnetic flux density in the direction of the X axis was measured at the intermediate point of the distance Zo is shown. The positive sign of the magnetic flux density in FIG. 9b represents the right direction of the X axis in FIG. 9a. The negative sign of the magnetic flux density in FIG. 9b represents the left direction of the X axis in FIG. 9a.

The magnetic flux density of the left direction of the X axis was maximum at the intermediate point of the distance Xo. The magnetic flux density of the right direction of the X axis was maximum at the outside of each of the first and second magnets 21, 22, but was one third of the magnetic flux density of the left direction of the X axis. In this example, the magnetization M of the magnet was 13,800 Gauss (G), the magnetic flux density at the intermediate point of the distance Xo was 6,090 G, the magnetic field was 6,900 Oersted (Oe) when the permeability u of air was presumed as 1.0. Therefore, the magnet having the magnetization of more than approximately 3,800 G (13,800 × 1,900/6900) must be used to magnetize the magnetic layer 12 having the coercive force of 1,900 Oe completely and uniformly. The upper limit of the magnetization was selected so as not to magnetize the magnetic layer 12 in the opposite direction by the opposite magnetic field at the outside of the first and second magnets 21, 22.

Figure 3B:
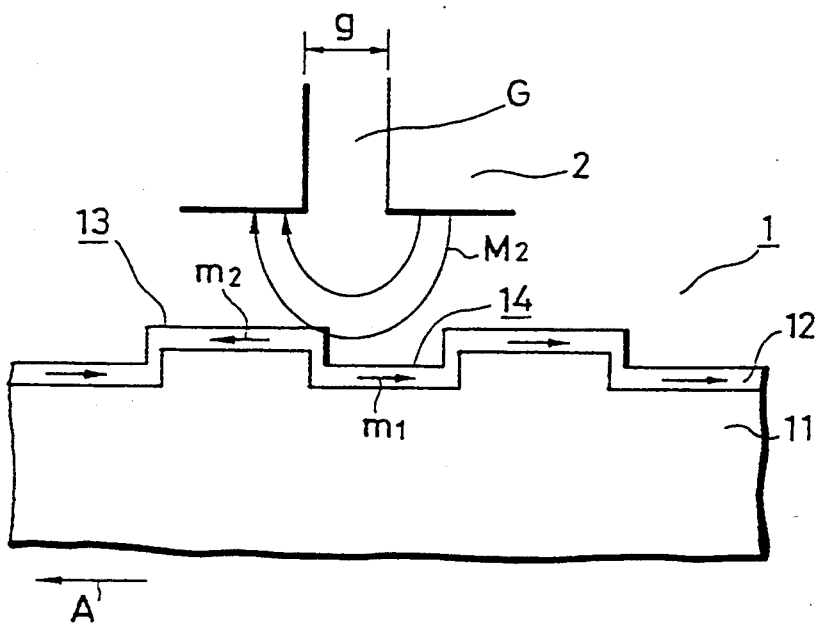

While the DC current was flown to the magnetic head 2 having the magnetic gap G of which the gap length $g_o$ was 0.4 um and the track width was 100 um, the magnetic head was moved in the direction of the diameter of the magnetic disk 1 so as to magnetize the projection portion 13 of the magnetic layer 12 in the direction opposite to the direction shown above to record the positioning signal, as shown in FIG. 3b. The positioning signal was reproduced with SN ratio enough for servo control by the magnetic head for reproducing in a conventional drive-system.

Thus, because the exchange of the magnetic heads is omitted, the productivity of the magnetic disks is improved also in this case.

EXAMPLE 6

Figure 10:
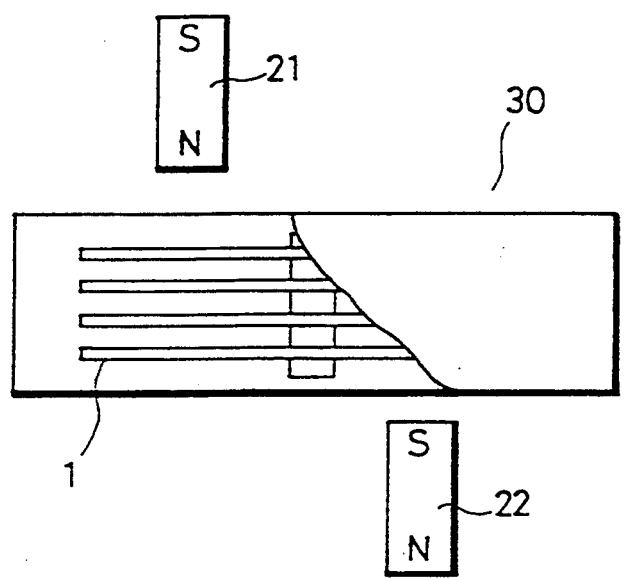
FIG. 10 depicts another embodiment of a recording method for a positioning signal of the present invention.
Figure 11:
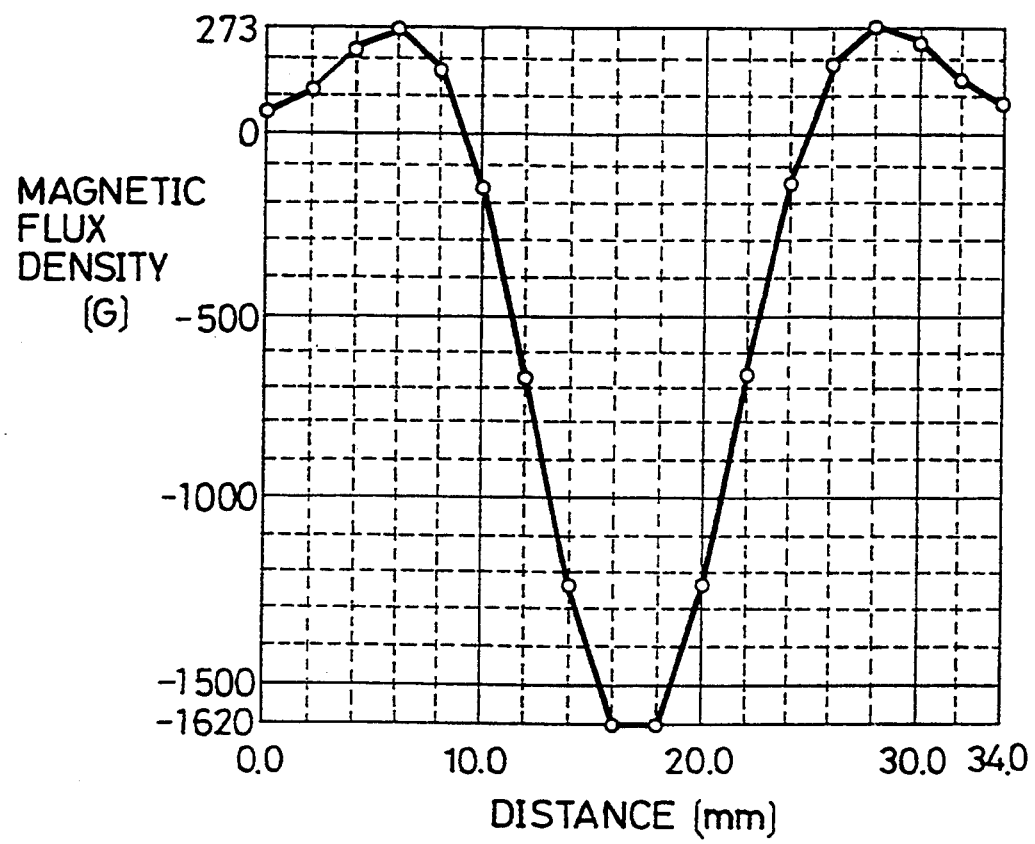
FIG. 11 illustrates a distribution of magnetic flux density by magnet.

In this example, after the magnetic disk 1 was magnetized in the direction of the magnetization m1 uniformly in a conventional drive-system, the projection portion 13 of the magnetic disk 1 was only magnetized in the direction of the magnetization m2 opposite to the direction of the magnetization m1 so as to record the positioning signal. Referring to FIG. 10, the one pole of the first magnet 21 and the other (opposite) pole of the second magnet 22 were spaced apart so as to put the direct system 30 therebetween and also in the direction of the circumference of the magnetic disk. The distribution of the magnetic flux density at this time is shown in FIG. 11.

The thickness of the drive system 30 was 10 mm, the distance from each of the first and second magnets 21, 22 being the same size as the magnet of Example 5 to the outside of the drive system 30 was 3 mm, and the magnets having the magnetization of 13,800 G was used. The maximum magnetic flux density G the intermediate point between the magnet 21 and the magnet 22 was 1,620 G which could magnetize the magnetic layer of 1,600 Oe uniformly. For example, the magnetization of the Nickel,Iron (Ni—Fe) permanent magnet was 13,800 G.

After that, the projection position of the magnet disk was only magnetized in the direction opposite to the direction shown above by the magnetic head set in the drive system and having a gap length of 0.4 um and a track width of 10 um so as to record the positioning signal. The positioning signal was reproduced with SN ratio enough for servo control.

Because the positioning signal is recorded by the first and second magnets set in a conventional drive system, and it is not necessary to use an exclusive system for recording the positioning signal, the productivity of the magnetic disks is improved.

EXAMPLE 7

Figure 4A:
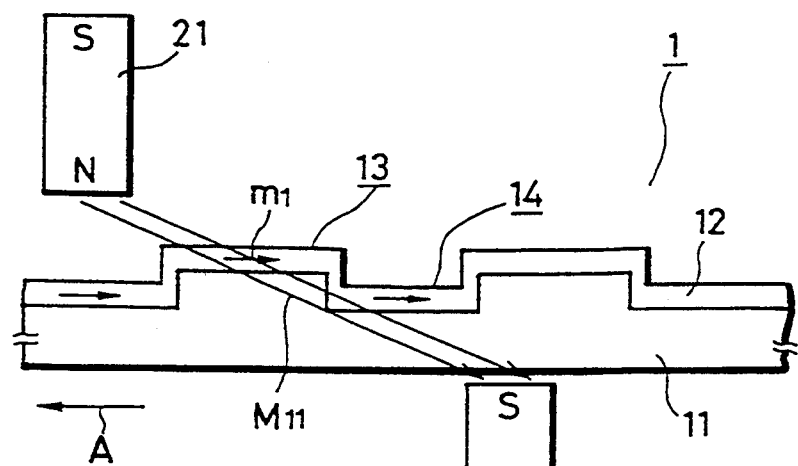
FIGS. 4a and 4b depict an alternate embodiment of a recording method for a positioning signal of the present invention.
Figure 4B:
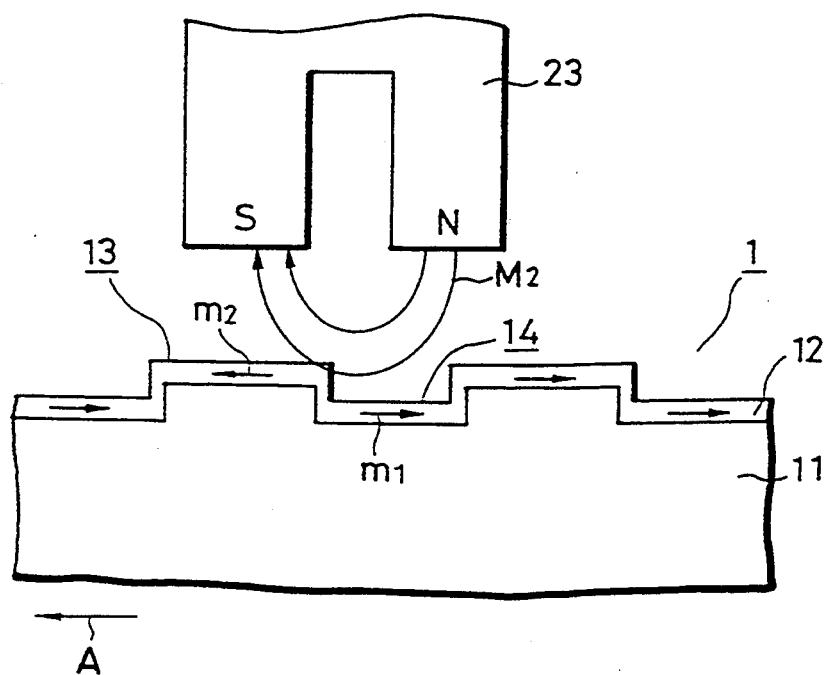

The one pole of the first magnet 21 and the other (opposite) pole of the second magnet 22 were spaced apart so as to put the magnetic disk 1 therebetween and also in the direction of the circumference of the magnetic disk. Each of the first and second magnets 21, 22 had the length of equal or more than the diameter of the magnetic disk 1. The magnetic layer 12 was magnetized in the direction of the magnetization m1 completely and uniformly by rotating the magnetic disk 1 in the direction of the arrow a as shown in FIG. 4A. After that, as shown in FIG. 4B, the third magnet 23 having a U shape and the length of equal or more than the diameter of the magnetic disk 1 was put over the magnetic disk 1. The projection portion 13 of the magnetic layer 12 was only magnetized in the direction of the magnetization m2 opposite to the direction of the magnetization m1 by rotating the magnetic disk 1 in the direction of the arrow 1 so as to record the positioning signal.

Figure 12A:
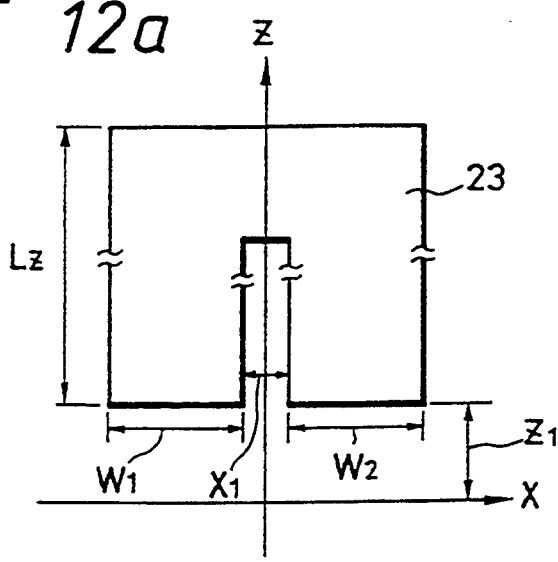
FIGS. 12a and 12b illustrate a distribution of magnetic flux density by magnet.
Figure 12B:
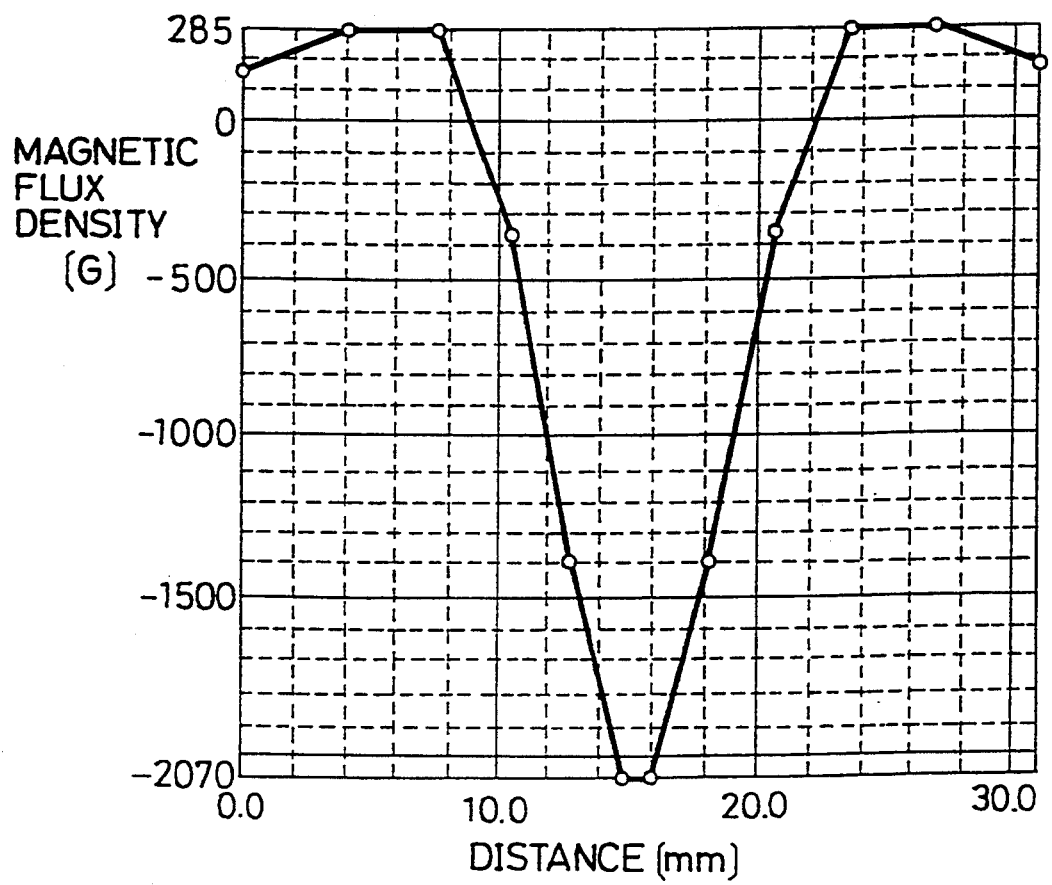

The distribution of the magnetic flux density was shown in FIG. 12 in the case which the magnetization M of U-shaped magnet was 13,800 G. When the direction of the circumference of the magnetic disk 1 was X axis and the direction of the thickness of the magnetic disk 1 was Z axis, the magnet, of which the width W1, W2 in the direction of the X axis was 6 mm, the distance X, between both poles was 2 mm and the length L2 in the direction of the Z axis was 20 mm, was used. The distribution of the magnetic flux density was measured at the distance Z1 of 6 mm from the pole of the magnet to the surface of the magnetic disk. The maximum magnetic flux density was 1,070 G and the magnetic field was 2,070 Oe. When the coercive force Hc of the magnetic layer 12 was 1,900 Oe, the magnetic field of approximately 380 Oe was necessary to magnetize the projection portion 13 in the direction of the magnetization M2. Therefore, the magnetization of this U-shaped magnet must be approximately 2,533 G (13,800×380/2,070).

Because the positioning signal is recorded by putting the first, second and third magnet and rotating the magnetic disk 1, the productivity of the magnetic disks is improved.

Instead of the third magnet 23, it is possible to put the bar-shaped third and fourth magnet over the magnetic disk 1 to record the positioning signal.

Comparative Example 1

Figure 13A:
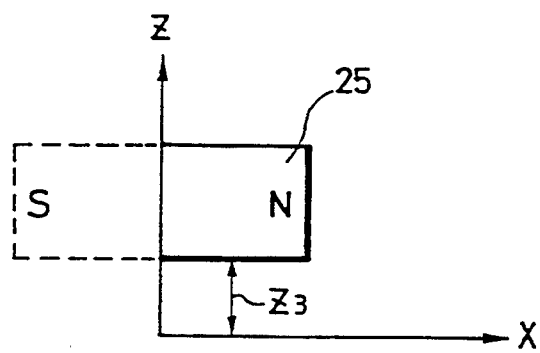
FIGS. 13a and 13b illustrate a distribution of magnetic flux density by magnet.
Figure 13B:
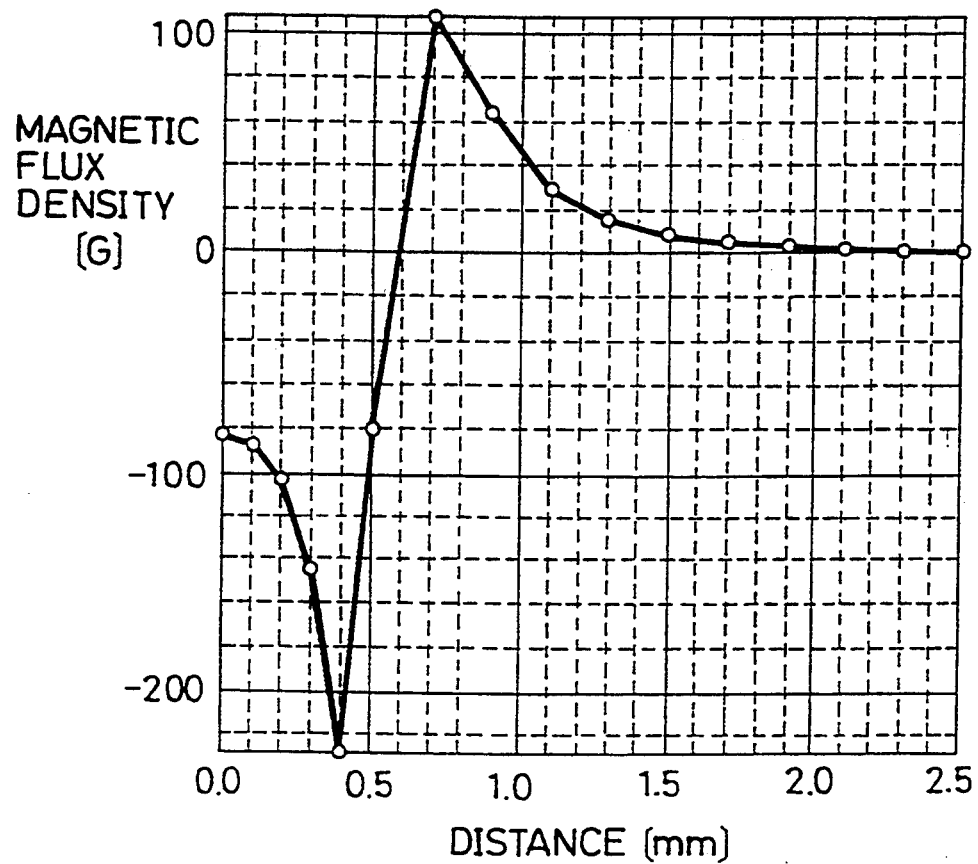

In this comparative example, when a bar-shaped magnet 25 was put over the magnet disk in parallel with the magnetic disk 1, the distribution of the magnetic flux density was measured as will be described by referring to FIGS. 13a and 13b. The distribution of the magnetic flux density in the direction of the X axis was measured at the distance Z3 of 0.1 um from the sidewall of the magnet to the surface of the magnetic disk 1. The magnetization M of the magnet was 13,800 G. Referring to FIGS. 13a and 13b, the right component was positive and the left component was negative. As a result, the magnetic flux density was negative at a little inside from the end of the magnet 25 and the magnetic flux density was positive at a little outside from the end of the magnet 25. Therefore, it was impossible to magnetize the magnetic disk uniformly by one bar-shaped magnet.

Comparative Example 2

Figure 14A:
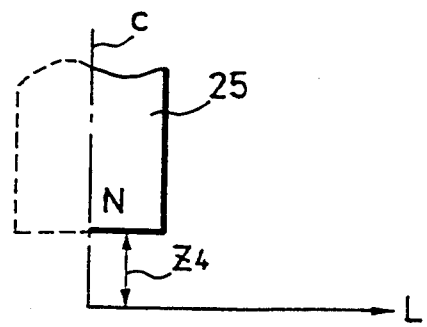
FIGS. 14a and 14b illustrate a distribution of magnetic flux density by magnet.
Figure 14B:
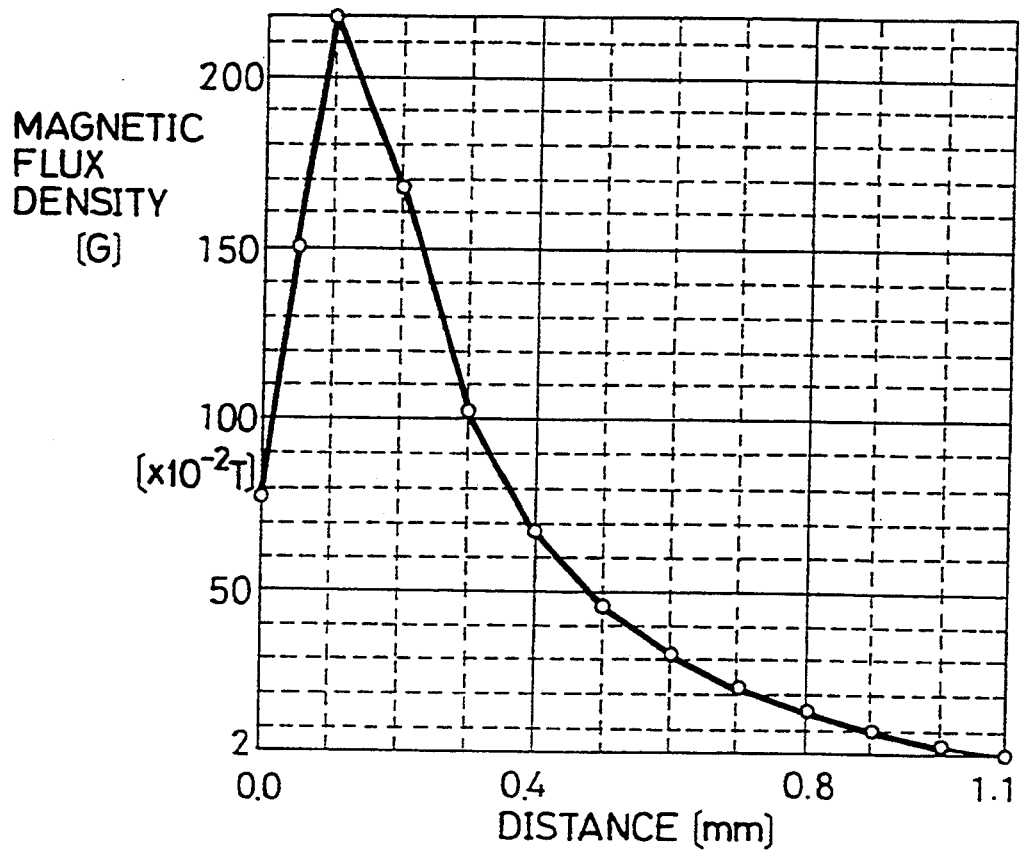
Figure 15A:
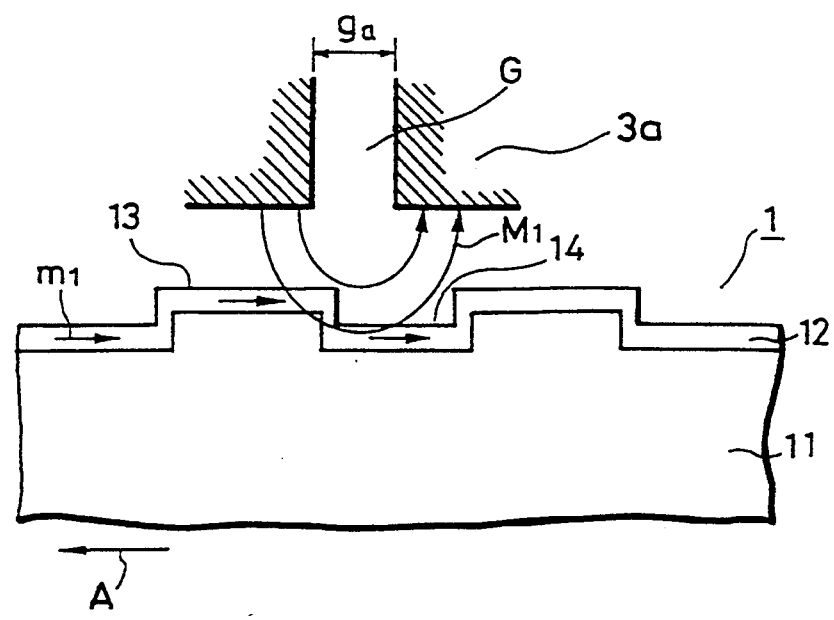
FIGS. 15a and 15b depict another embodiment of a recording method for a positioning signal in accordance with the prior art.
Figure 15B:
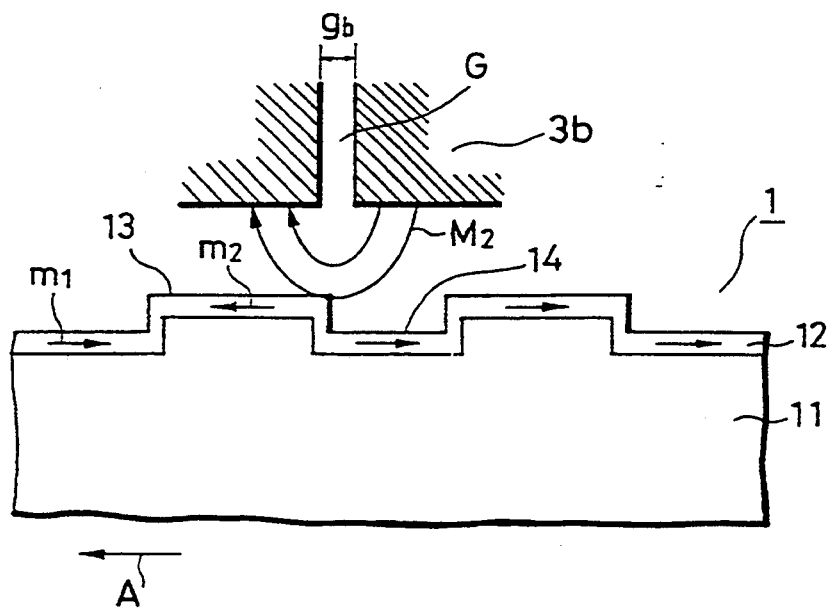

When a bar-shaped magnet 25 was put over the magnetic disk 1 vertically, the distribution of the magnetic flux density was measured as will be described by referring to FIGS. 14a and 14b. The distribution of the magnetic flux density in the direction of the X axis was measured at the distance Z4 of 0.1 um from the sidewall of the magnet to the surface of the magnetic disk 1. The direction of the magnetic flux density was the same from the center of the magnet to the right side of the magnet. But the direction of the magnetic flux density in the left side of the magnet was opposite to the direction of the magnetic flux density shown above. Consequently, it is difficult to uniformly magnetize the magnetic disk.

We claim:

1. A method for recording a positioning signal on a magnetic disk comprising:
   rotating said magnetic disk having a magnetic layer on a non-magnetic substrate having a projection pattern thereon, wherein said projection pattern includes a projection portion, flowing a first DC current to a magnetic head, moving said magnetic head in the direction of the diameter over said magnetic disk whereby to magnetize said whole magnetic layer of said magnetic disk in a first direction, then rotating said magnetic disk, flowing a second DC current to said magnetic head, moving said magnetic head in the direction of the diameter over said magnetic disk whereby to magnetize only said magnetic layer of the projection portion of said magnetic disk in a second direction opposite to the first direction.

2. A method according to claim 1 wherein said second DC current is smaller than said first DC current.

3. A method according to claim 1 wherein said magnetic head is positioned at first and second flying heights from said magnetic layer and wherein said first flying height of said magnetic head at the time when said first DC current flows to said magnetic head is smaller than said second flying height of said magnetic head at the time when said second DC current flows to said magnetic head.

4. A method for recording a positioning signal on a magnetic disk comprising:

rotating said magnetic disk having a magnetic layer on a non-magnetic substrate having a projection pattern thereon, wherein said projection pattern includes a projection portion, disposing a first magnet having a length of equal or longer than the diameter of said magnetic disk and a second magnet having a length of equal or longer than the diameter of said magnetic disk so as to put said magnetic disk therebetween and face one pole of said first magnet to opposite pole of said second magnet and space apart in the direction of the plane of said magnetic disk whereby to magnetize said whole magnetic layer of said magnetic disk in the first direction, then rotating said magnetic disk, flowing a DC current to a magnetic head, moving said magnetic head in the direction of the diameter over said magnetic disk whereby to magnetize only said magnetic layer of the projection portion of said magnetic disk in a second direction opposite to the first direction.

5. A method for recording a positioning signal on a magnetic disk comprising:

rotating said magnetic disk having a magnetic layer on a non-magnetic substrate having a projection pattern thereon, wherein said projection pattern includes a projection portion, disposing a first magnet having a length of equal or longer than the diameter of said magnetic disk and a second magnet having a length of equal or longer than the diameter of said magnetic disk so as to put said magnetic disk therebetween and face one pole of said first magnet to opposite pole of said second magnet and space apart in the direction of the plane of said magnetic disk whereby to magnetize said whole magnetic layer of said magnetic disk in a first direction, then rotating said magnetic disk, disposing a third magnet having a length of equal or longer than the diameter of said magnetic disk over said magnetic disk, or disposing the third magnet having a length of equal or longer than the diameter of said magnetic disk and a fourth magnet having a length of equal or longer than the diameter of said magnetic disk over the same side of said magnetic disk whereby to magnetize only said magnetic layer of the projection portion of said magnetic disk in a second direction opposite to the first direction.

6. An apparatus for recording a positioning signal on a magnetic disk comprising:

a rotating means to rotate said magnetic disk having a magnetic layer on a non-magnetic substrate having a projection pattern thereon, a magnetic head to magnetize said magnetic disk and change a pole and dimension of a DC current which flows to said magnetic head, a moving means to move said magnetic head in the direction of the diameter over said magnetic disk.

7. An apparatus for recording a positioning signal on a magnetic disk comprising:

a rotating means to rotate said magnetic disk having a magnetic layer on a non-magnetic substrate having a projection pattern thereon and change a number of revolutions, a magnetic head to magnetize said magnetic disk and change a pole of a DC current which flows to said magnetic head, a moving means to move said magnetic head in the direction of the diameter over said magnetic disk.

8. An apparatus for recording a positioning signal on a magnetic disk comprising:

a rotating means to rotate said magnetic disk having a magnetic layer on a non-magnetic substrate having a projection pattern thereon, a first magnet having a length of equal or longer than the diameter of said magnetic disk and a second magnet having a length of equal or longer than the diameter of said magnetic disk disposed so as to put said magnetic disk therebetween and face one pole of said first magnet to opposite pole of said second magnet and space apart in the direction of the plane of said magnetic disk, a magnetic head to magnetize said magnetic disk and change a pole of a DC current which flows to said magnetic head, a moving means to move said magnetic head in the direction of the diameter over said magnetic disk.

9. An apparatus for recording a positioning signal on a magnetic disk comprising:

a first magnet having a length of equal or longer than the diameter of said magnetic disk and a second magnet having a length of equal or longer than the diameter of said magnetic disk disposed so as to put said magnetic disk therebetween and face one pole of said first magnet to opposite pole of said second magnet and space apart in the direction of the plane of said magnetic disk, a third magnet having a length of equal or longer than the diameter of said disk over said magnetic disk and/or a fourth magnet having a length of equal or longer than the diameter of said magnetic disk over the same side of said magnetic disk.

* * * * *